United States Patent [19]
Wachtell et al.

[11] 3,965,741
[45] June 29, 1976

[54] TIME TEMPERATURE INDICATOR DEVICE AND METHOD
[75] Inventors: George Peter Wachtell, Maple Shade, N.J.; Edward Wilred Jones, Upper Darby, Pa.
[73] Assignee: Campbell Soup Company, Camden, N.J.
[22] Filed: May 8, 1975
[21] Appl. No.: 575,589

[52] U.S. Cl. ................................. 73/344; 73/358; 116/114 Y; 116/114.5
[51] Int. Cl.² ..................... G01K 3/00; G01K 11/06
[58] Field of Search ..................... 116/114.5, 114 Y; 58/145 R, 152 R, 42, 1; 73/358, 343 R, 344

[56] References Cited
UNITED STATES PATENTS

| | | | |
|---|---|---|---|
| 2,788,282 | 4/1957 | Hammond | 116/114.5 |
| 3,333,476 | 8/1967 | Hardy | 73/362 AR |
| 3,713,416 | 1/1973 | Volk | 73/358 |
| 3,759,103 | 9/1973 | Volk | 73/358 |
| 3,777,696 | 12/1973 | Bilbrey | 116/114.5 |

FOREIGN PATENTS OR APPLICATIONS

| | | | |
|---|---|---|---|
| 122,613 | 8/1948 | Sweden | 58/1 |

Primary Examiner—S. Clement Swisher
Assistant Examiner—Denis E. Corr
Attorney, Agent, or Firm—Paul & Paul

[57] ABSTRACT

An indicating device is provided, employing a plunger or piston movable along a casing, through a viscous liquid that provides an opposing force to the force provided by a spring that urges the piston in its movement. The viscous liquid is substantially uniform with temperature changes. A rod carried by the piston is initially in engagement with the casing, but releasable upon reaching a predetermined temperature, for substantially uniform movement of the piston through the fluid, with the rod being re-engageable with the casing upon solidification of a eutectic metal type connection upon reduction of the temperature, whereupon piston movement is halted. The device is used to determine not only if a product at the interior of a container has reached the desired temperature, but the length of time that the interior of the container remained at the desired temperature, and to this end, calibrations on the device may be provided.

12 Claims, 4 Drawing Figures

TIME TEMPERATURE INDICATOR DEVICE AND METHOD

BACKGROUND OF THE INVENTION

In sterilizing foods, particularly goods being heated, cooked, or sterilized on a mass-production basis, it is necessary to ascertain that the heater is functioning at the desired level, to bring the food within the container to the desired temperature.

In accordance with the present invention, it has been determined that it is desirable not only to ascertain that the desired temperature level is reached, but to ascertain if the desired temperature level is reached for all of the product within the container, especially at the center of the can or other container. Even further, it is deemed to be desirable to ascertain the length of time that the food product at the center of the container (generally the last portion of food product to reach the desired temperature) has remained at the desired temperature.

In so doing, it has been determined that it would be desirable to have an indicating device that would accomplish these ends, and that could be run through that portion of the assembly line process directed to heat treating, as a test container, being exposed to the same heat treatment as are products actually being produced. To this end, a test container is utilized adapted for maintaining the desired device at the center of the container, and preferably immersed in the food product being heated. After the heating operation, the test container may be removed from the assembly line, checked to ascertain if the desired temperature was reached, and the length of time that the desired temperature at the location (preferably center) of the container was maintained at the temperature, in order to ascertain if the heating, cooking, sterilizing, etc. process is functioning as planned.

In order to accomplish these ends, particular time temperature level indicating device has been developed.

THE PRIOR ART

Temperature indicating devices have been developed in the past, some of which utilize spring-biased plungers having portions that move through alloys that are sufficiently temperature responsive to liquefy upon reaching a desired temperature, wherein the length of piston movement is related to the degree of liquefication of the temperature-responsive material. Some of these devices have been developed to ascertain if home-cooked meats and the like are achieving the desired temperature, and others have been developed as frozen food indicators, predicated upon movement of a piston, plunger or the like, that is spring biased, against melting ice. Others use a plurality of substances, that melt at different temperatures, to determine if certain predetermined temperature levels have been reached. Examples of certain prior art devices are as follows:

U.S. Pat. Nos. 3,759,103; 3,713,416; 3,090,235; 2,915,405; 2,788,282; 1,441,307.

THE PRESENT INVENTION

The present invention is directed to providing a temperature level indicating device employing biasing means operable upon a plunger that moves against a resistance that is provided by substantially uniform, non-temperature-responsive viscous liquid, when the plunger is released upon melting of a separate temperature-responsive material, for movement of the plunger along its casing a distance that is indicative of the length of time of the device at the desired temperature, and with such motion being discontinued upon reduction of the temperature such that said separate substance solidifies and interrupts the plunger movement. The device is preferably used in a test container to determine by visual observation after it is removed from the container, if food at the center of the container has reached the desired temperature, and also to determine the length of time that the food at the center of the container was exposed to the temperature.

Accordingly, it is a primary object of this invention to provide a novel temperature level indicator device. It is a further object of this invention to provide a novel temperature level indicating device utilizing a movable plunger, the motion of which may be continued or discontinued depending upon the melting or solidification of a temperature-responsive substance, and which employs a substantially-temperature-nonresponsive substance as a resistance to movement of a plunger against an urging force, that will yield substantially uniform motion of the plunger during the period of its motion.

It is another object of this invention to provide a novel method of checking cooked, heated food or the like for ascertaining if the centers of containers in which the heat treatment is being done have reached the desired temperature level, and for ascertaining the length of time that the minimum desired temperature level has been maintained.

Other objects and advantages of the present invention will be readily apparent to those skilled in the art by reading the following brief descriptions of the drawing figures, detailed descriptions of the preferred embodiments, and the appended claims.

BRIEF DESCRIPTIONS OF THE DRAWING FIGURES

DESCRIPTION OF THE PREFERRED EMBODIMENTS

Figure 2:
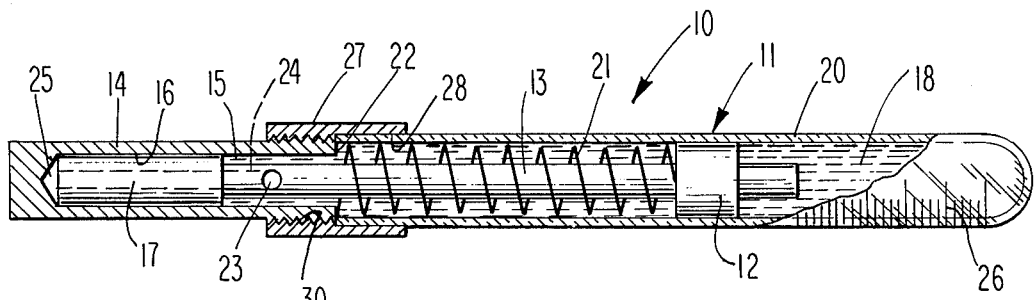
FIG. 2 is a longitudinal sectional view taken through a device in accordance with the present invention, with the right-most end of the device of FIG. 2 being illustrated in elevation, in order to show graduations.

Referring now to the drawings in detail, reference is first made to FIG. 2, wherein a device generally designated by the numeral 10 is illustrated, as comprising a casing 11, having a piston 12 longitudinally slidable therein, with an elongate rod 13 carried by the piston or plunger 12 for movement therewith.

The leftward end 14 of the casing 11 as illustrated in FIG. 2 provides a well 15 to which the left-most end of the rod 13 is secured to an inner bore 16 thereof by means of a meltable eutectic metal 17. The member 14 is preferably of copper construction, and the material 17 that adheres the rod 13 to the inner bore 16 is preferably of tin-indium eutectic alloy with a melting point of approximately 241°F. As an alternative, the eutectic substance 17 may be a lead-bismuth eutectic alloy of of approximately 257°F, melting point. It will be understood that the heat-responsive substance 17 will be selected in accordance with a desired melting point, to melt at a desired temperature with respect to which, it is desired to have the food reach. It is desired that the meltable substance 17 have the capability of "wetting" the surfaces of the rod 13 and of the well 16, and be chemically inert to other materials of the device 10 with which it comes in contact, specifically with the viscous fluid 18 at the right end of the device 10.

The viscous fluid 18 is disposed rightwardly of the plunger or piston 12, as viewed in FIG. 2, inside the preferably glass, but in any event transparent portion 20 of the casing 11.

A compression spring 21, preselected in accordance with a desired force-urging capability, is in engagement against the left end of the piston 112, at one end, and in engagement against a shoulder 22 of the casing portion 14, at its other end, in order to urge the piston 12 rightwardly as viewed in FIG. 2, into the fluid 18.

Initially, the eutectic 17 is solidified, and upon its melting, upon a predetermined desired temperature having been reached, the spring 21 will urge the plunger or piston 12 rightward, carrying the attached and now released rod 13 rightward therewith, under the force of the spring 21. Resistance to the normal accelerative motion that would be induced by the spring 21 is provided in the form of the viscous material 18, that is separate from the eutectic 17, and that is normally carried at the right end of the casing 11 as viewed in FIG. 2. The material 18 is preferably selected to be non-temperature-responsive, to be substantially viscous, but such that its viscosity does not change with temperature. The retarding influence exerted by the material 18, passing between the piston 12 and the bore of the glass or otherwise transparent portion 20 of the casing 11 serves to provide a substantially uniform, or almost linear motion for the piston 12 in its rightward movement.

The material 18 may be of any selected type suitable for accomplishing the purposes of the present invention, but it has been found that a substantially heavy viscous material of the type manufactured under the trade name Dow Corning 200, having about 100,000 c.s. viscosity is suitable. As the piston 12 moves rightwardly, the viscous fluid 18 travels leftwardly, as viewed in FIG. 2, past the essentially annular void between the piston 12 and the bore of the casing portion 20 (except for three equally angularly spaced spacing feet of the type illustrated in greater detail with respect to the embodiment of FIG. 3), to pass over the rod 13, through the spring 21, and to be accommodated leftward of the piston 12. As the piston 12 moves toward the right end of the casing 11 as viewed in FIG. 2, a cross-bore 23 accommodates the viscous fluid into the longitudinal bore 24, for reception within the left-most end of the well 25 as viewed in FIG. 2.

Upon reduction in temperature of the container to which the device 10 is applied, below the melting point of the eutectic 17, the eutectic will solidify, adhering the leftmost end of the rod 13 at some point within the well 15, as viewed in FIG. 2, thereby discontinuing the longitudinal movement of the piston 12 within the casing 11. At that point, indicia in the form of graduations 26 may be read, after removal of the device 10 from its test container, which graduations 26 have preferably previously been calibrated to relate the distance of travel of the piston 12 from the initial time of melting of the eutectic 17 which commenced longitudinal movement of the piston 12, to the final position of the piston 12 as dictated by the point at which the eutectic 17 resolidifies, all to the time period of motion of the piston 12, which corresponds to the time period during which the eutectic 17 was in its melted condition.

The casing portion 20, being preferably glass, is secured to a threaded fastener 27 by means of any suitable adhesive or the like that will secure the casing portion 20 in a bore 28 thereof. The connector 27 is threaded at 30, to accommodate threads of the outer end portion of metal casing portion 14, the left-most end of which as viewed in FIG. 2 comprises a blind bore.

If desired, venting may be provided through a loose screw arrangement at the mating screws 30.

It will be understood that the graduations 26 may not be particularly linear, depending upon the degree to which the motion of the piston 12 as taught herein is not precisely linear during the period that the eutectic 17 is in the melted condition. Thus, the graduations 26 on the casing portion 20 may be pre-calibrated to correspond to time indications during which the eutectic 17 is in the melted condition. In the alternative, it may be desired to have the graduations 26 precisely equally spaced and linear, and to then read the device by reading the distance of travel of the piston 12 as shown on the calibrations 26, and then to relate that piston movement to time, by reference to a distance-time graph or the like.

Also, the empty space 25 at the left-most end of the device of FIG. 2 facilitates allowance for thermal expansion of the viscous material 18. The retarding influence of the viscous material 18, in opposition to the spring 21 is such that a substantially constant velocity, or uniform motion, is achieved for the motion of the piston 12.

Figure 3:
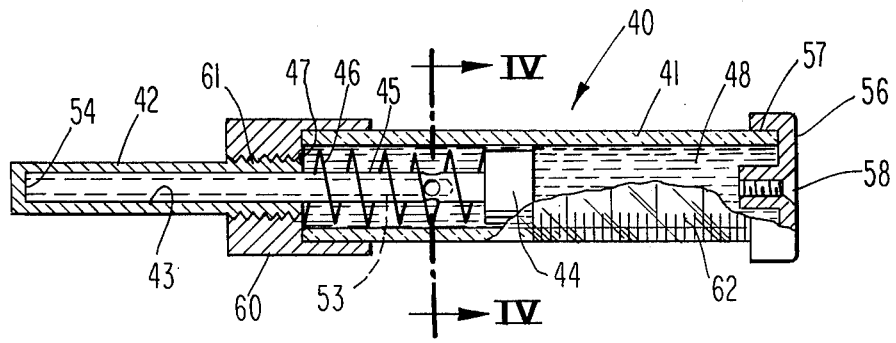
FIG. 3 is a view similar to that of FIG. 2, but of an alternative embodiment of a device in accordance with the present invention.
Figure 4:
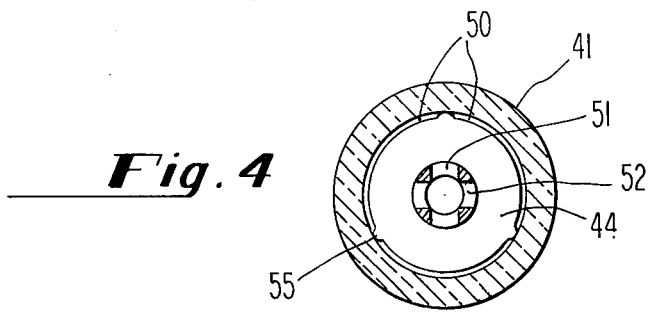
FIG. 4 is an enlarged transverse sectional view, taken generally along the line IV—IV of FIG. 3, and wherein the piston clearance within the casing bore, and the spacing feet that maintain the clearance, is best illustrated.

With reference now to FIG. 3, an alternative device 40 is illustrated, as comprising a glass sleeve 41 that forms part of the casing, with the left-most portion of the casing 42 providing a well 43. A piston 44 is provided, with a rod 45 carried thereby for movement therewith. The left end of the rod 45, like the rod 13 in FIG. 2, is provided with a eutectic metal (not shown) like that 17 in FIG. 2, for originally maintaining the rod 45 solidified or adhered to the inner bore of the preferably copper well 43.

A compression spring 46, seated at its right end against the piston or plunger 44, and engaged against a shoulder 47 at its left end as viewed in FIG. 3, provides the biasing force, for biasing the piston 44, upon melting of the eutectic that adheres the rod 45 and well bore 43 together, such that the piston 44 moves against the viscous fluid 48 as aforesaid. The fluid 48, upon such rightward motion of the piston 44, passes around the piston 44, between it and the inner wall of the casing 41, through the essentially annular recess 50 formed therebetween, into the zone provided for accommodating the spring 46, and with cross-bore means 51 and 52 being provided for accommodating receipt of the viscous fluid through the rod 45, by passing through the cross-bores 51 and 52, and through the longitudinal bore 53, into the well 43, between the left-most end of the rod 45 and the blind bottom 54 of the well 43. Three equally-angularly spaced feet 55 provide for centering of the piston or plunger 44 within the bore of the casing 41, because lack of centering can provide undesired differences in friction or resistance of the fluid 48 to the movement of the piston 44, and accordingly, centering of the piston 44 is desirable.

The right-most end of the glass tube portion 41 of the casing is provided with a closure 56 preferably adhesively secured thereto at 57, and with a screw type opening 58 being provided for entry or withdrawal of fluid 48, as desired.

A coupling member 60 connects members 41 and 42 together, preferably being adhesively secured to the left-most end of the member 41 as illustrated in FIG. 3, and being in fitted engagement at 61 with the member 42. The threaded engagement 61 may also be loose, for venting purposes, to allow a small leakage path to the outside, for air bubbles or the like, as desired.

Graduations 62 or other suitable indicia for indicating distance, or preferably calibrated to indicate time of melt of the eutectic during which there has been motion of the piston 44, is provided, in the same manner as described above for the embodiment of FIG. 2.

It will be apparent that spring constants and viscous liquids will be pre-selected, for the type of uniform motion desired. Similarly, eutectics or other meltable substance that facilitate melting and commencement of motion of the piston, and discontinuance of such motion upon solidification, may also be selected in accordance with the desired temperature levels for given cooking, heating operations, or the like.

The portions of the casing that have graduations thereon are preferably transparent, and because of the heat-resistant desirability of glass for accomplishing these purposes, such are generally of glass construction.

The viscous fluid that flows past the piston or plunger through the essentially annular clearance does so at a volumetric flow rate that is substantially equal to the rate at which the volume between the piston and the end of the tubular housing is reduced due to the motion of the piston.

The use of a fluid retardant to the otherwise accelerative force of the piston induced by the expanding spring provides the desired substantially uniform, or substantially constant velocity motion for the piston 44.

Figure 1:
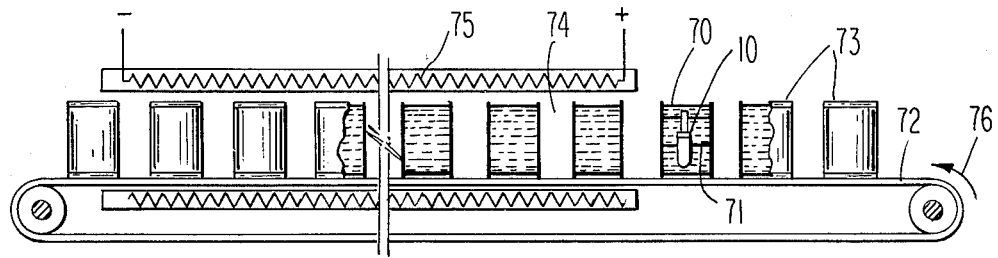
FIG. 1 is a schematic side elevational view of a cooking, heating process or the like, employing the device of the present invention to indicate temperature at container interiors as food in the containers is being heated, on a test-container basis.

With particular reference to FIG. 1, it will be seen that a temperature level indicator device 10 (or 40, depending upon the embodiment to be used) may be provided in a test can 70, with its position being maintained by suitable wire guides 71 or the like therein, in order that the device 10 will remain essentially centered longitudinally in the test can or other suitable container 70.

The test container 70 is then placed onto a conveyor or the like 72, along with other containers 73 having a food product, such as soup, solids, or other foods therein, for delivery through a heating zone 74, wherein the heating, boiling, cooking, sterilization or the like will be accomplished by known techniques, such as by the use of electric heaters or the like 75, steam heaters, etc. as desired.

During the passage of the containers 73 and the test container 70 through the heating zone 74, by their movement with the conveyor 72 in the direction of the arrow 76, the food product within the containers 73 will be exposed to a temperature. Monitoring of the temperature that is generally the most difficult to elevate; namely at the center of the containers 73 is done with the placement of the device 10 or 40 at the center of the container 70, such that, as the device 10 is raised to the desired predetermined temperature at which a pre-selected eutectic or like substance 17 will melt, such melting takes place, thereby releasing the spring-biased plunger or piston to move against the retarding medium, or separate resistance means provided by the viscous fluid as discussed above. As the test container 70 nears the end of the heating zone 74, such that sufficient cooling is effected that the eutectic 17 will then solidify with the piston or plunger now in a new position further away from the well of the device, the motion of the piston will be discontinued, and the device 10 may be removed from the container 70 for visual observation of the distance of motion of the piston 12 at at least the temperature that corresponds to the melting temperature of the eutectic, such reading either being made directly and then by reference to a graph or the like being translated to a time at the desired temperature, or such reading being made by reading pre-determined calibrated indicia that provides an immediate time-correlation of the motion of the piston.

It will thus be seen that the ends of the invention are satisfied. It will be apparent from the foregoing that various substitutions may be made in materials, such as of the use of high temperature plastics for glass portions of the device, of the selection of desired spring constants, of substitution of various other viscous fluids, of the use of different eutectics, and various other details of construction of the devices of the present invention may be altered, all within the spirit and scope of the invention as defined in the appended claims.

While the disclosure hereof for example is of threaded connections between different components, and such is preferable, for ease of disassembly, reassembly, and the like, it will be apparent that the device of the present invention would be made in throwaway form, where relative removability of components is not desired. Furthermore, while the passage between the piston and the associated wall of the casing has been described as being substantially annular, except for centering-feet spacers, it will be apparent that the path of flow of the viscous substance from one side of the piston to the other could be by other techniques, such as by means of holes, bores or the like extending through the piston, rather than at its periphery. Also, the device of the present invention may be made in various sizes, with various clearances, etc., all selected for the purposes of accomplishing the invention as set forth herein.

What is claimed is:

1. A temperature level indicator device comprising a casing adapted for insertion in a substance desired to be checked as to temperature, plunger means movable in said casing, biasing means in said casing for biasing said plunger means for movement in a given direction, temperature responsive means operatively associated with said plunger means for initially holding the position of said plunger means relative to said casing for releasing said plunger means for movement in said given direction relative to said casing in response to a predetermined temperature thereof, and for positively discontinuing said movement of said plunger means relative to said casing in response to a reduction of the temperature of said temperature responsive means below said predetermined temperature, and resistance means separate from said temperature responsive means disposed in said casing and operatively associated with said plunger means for opposing forces exerted on said plunger means by said biasing means during said movement for facilitating substantially uniform motion of said plunger means during its said movement, and means for giving an indiction of distance of movement of said plunger means during the period that said temperature responsive means is at the level of said predetermined temperature.

2. The device of claim 1, wherein said resistance means comprises a fluid having a viscosity that is substantially independent of temperature.

3. The device of claim 1, wherein said casing is provided with indicia means for indicating length of time of exposure of said temperature responsive means to a temperature in excess of said predetermined temperature as a function of movement of said plunger means in said casing.

4. A temperature level detection device comprising a longitudinally disposed casing having a piston slidable for longitudinal movement therein, a rod carried by the piston extending into a well in a first end of the casing, a heat-responsive meltable substance of predetermined melting temperature in the well normally fastening the rod to the casing in the well, a spring in the casing engaged for biasing the piston toward a second, opposite end of the casing, a viscous liquid substance in said second end of the casing, passage means for traversal of the piston with the liquid, with the liquid having a viscosity that is substantially independent of temperature whereby a melted condition of said substance allows biased piston movement against said viscous liquid toward said second end of said casing, releasing the rod from its fastened position in the well.

5. The device of claim 4, wherein the casing defines a predetermined allowable zone of movement for said piston, and wherein the well is sized to be of a sufficiently longitudinal dimension to accommodate the rod therein throughout said allowable zone of piston movement, whereby reduction of temperature to solidify said substance effects refastening of said rod in said well.

6. The device of claim 5, wherein a portion of the casing is transparent, with indicia means thereon for providing a visual indication of piston movement.

7. The device of claim 6, wherein said indicia means is graduated for said piston movement to correspond to time that the substance is in melted condition.

8. The device of claim 6, wherein passage means is provided for accommodating delivery of viscous liquid that is delivered past said piston, into said well.

9. The device of claim 8, wherein said piston and casing are each generally circular in transverse cross-section, and said piston is provided with an annular clearance between itself and an inner wall of said casing, with said annular clearance being interrupted by a plurality of piston-centering feet.

10. The device of claim 9, wherein said meltable substance is a eutectic metal, wherein said well and said rod are each of metal construction, and wherein means are provided for removably connecting said transparent portion of said casing from said well.

11. The device of claim 4, wherein said heat-responsive meltable substance serves as a means for whetting the surfaces of said well and said rod.

12. A method of checking cooked or heated food and the like for ascertaining both if the centers of containers in which the heated treatment is being done have reached the desired temperature level, and the length of time that the minimum desired temperature level has been maintained, comprising the steps of:

a. providing a device sized for insertion in a container of a size to be checked, which device includes a movable member, temperature responsive means for releasing and discontinuing a temperature responsive release wherein said member is movable in a casing after a temperature responsive release and under a biasing force operative against a motion retarder separate from said temperature responsive means that effects substantially uniform motion of the member during the period of time that the minimum temperature is reached and until a temperature responsive discontinuance in motion of the member is effected, b. placing the device in a test container and mounting the device at the center of the test container, c. placing the test container in an assembly line of food containers being heat treated by cooking, heating or the like.

d. passing the food containers and the test container through a heating, cooking zone or the like that has been set for heating containers to a desired temperature and for sustaining that temperature for a predetermined period of time, then e. checking the device after its passage through the zone and ascetaining from the device
  i. if the center of the test container reached the desired minimum temperature, by visually observing if there has been movement of the said member, and
  ii. if the desired period of time that the center of the test container has sustained the minimum desired temperature has been achieved, by visually observing the distance of movement of said movable member against the motion retarder, the said movement of the movable member being calibrated to reflect the corresponding time period of motion.

* * * * *